No. 745,631. PATENTED DEC. 1, 1903.
E. R. LANPHER.
APPARATUS FOR APPLYING RUBBER TIRES TO VEHICLES.
APPLICATION FILED APR. 23, 1903.
NO MODEL.
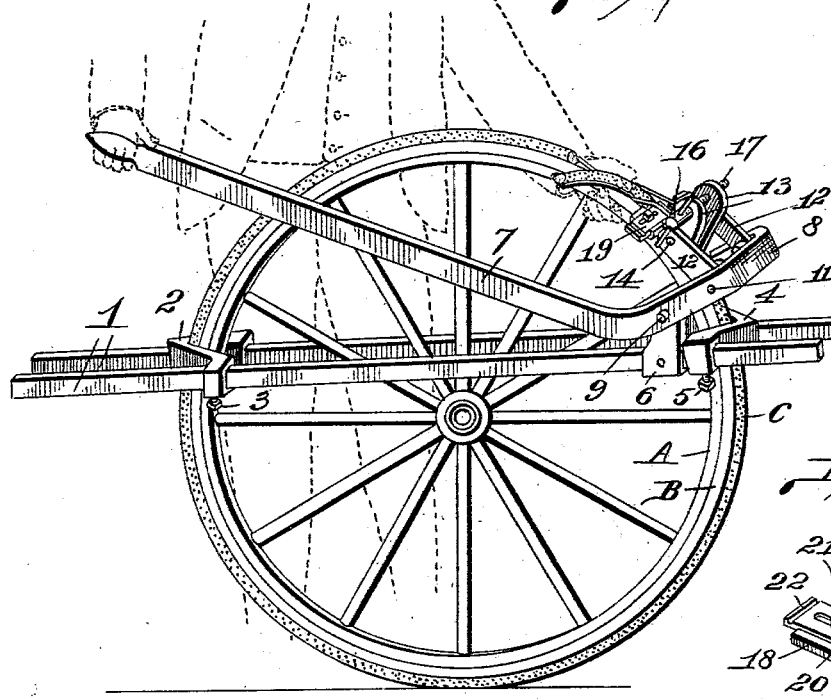
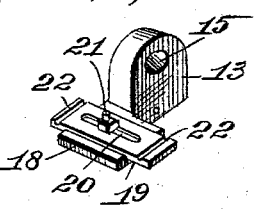
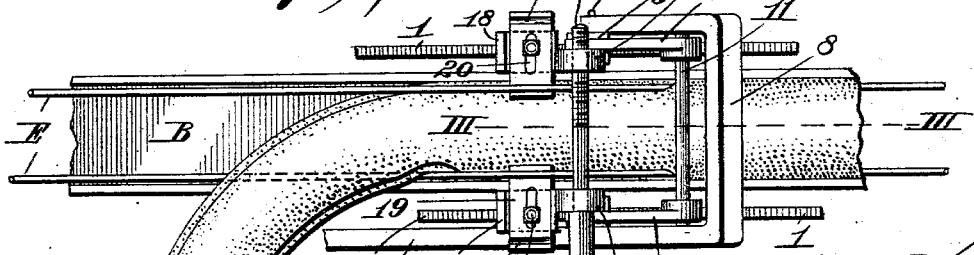
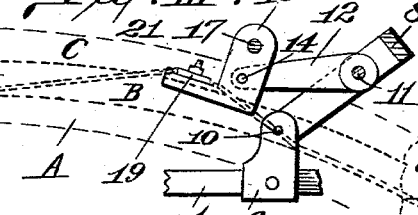

No. 745,631.

Patented December 1, 1903.

UNITED STATES PATENT OFFICE.

EARL R. LANPHER, OF CARTHAGE, MISSOURI.

APPARATUS FOR APPLYING RUBBER TIRES TO VEHICLES.

SPECIFICATION forming part of Letters Patent No. 745,631, dated December 1, 1903.

Application filed April 23, 1903. Serial No. 153,925. (No model.)

*To all whom it may concern:*

Be it known that I, EARL R. LANPHER, a citizen of the United States, residing in Carthage, in the county of Jasper and State of Missouri, have invented certain new and useful Improvements in Apparatus for Applying Rubber Tires to Vehicle-Wheels, of which the following is a full, clear, and exact description, reference being had to the accompanying drawings, forming part of this specification.

My invention relates to an apparatus for use in introducing the retaining-wires into the receiving-grooves of rubber vehicle-tires.

The object of my invention is to provide an apparatus by which said wires may be placed into the grooves in the tires with less straining effect thereupon than in previous methods.

My invention consists in features of novelty hereinafter fully described, and pointed out in the claims.

Figure I is a side elevation of a vehicle-wheel with my apparatus shown in perspective thereupon, as used in the act of applying a tire to the wheel. Fig. II is a top view of the operating parts of my apparatus and a fragment of a vehicle-wheel channel-rim and tires shown therein, as in the act of seating the retaining-wires. Fig. III is a section taken on line III III, Fig. II. Fig. IV is a perspective view of one of the clamping-jaws and lifting-plates carried thereby. Fig. V is a cross-section of a vehicle-wheel rim and tire of the type with which my apparatus is used.

A designates the rim of a vehicle-wheel that is encircled by a channel-rim B.

C is a rubber tire seated in the channel-rim B and provided near its base with continuous grooves D for the reception of retaining-wires E. (See Fig. V.)

1 designates a pair of supporting-bars that are arranged in parallel lines and occupy positions at opposite sides of the wheel A, as seen in Fig. I. These supporting-bars are upheld at the sides of the vehicle-wheel by rear and forward V-shaped cross members 2 and 4, the arms of which are slidably positioned on the supporting-bars 1, to which they are respectively held by set-screws 3 and 5.

The V-shaped cross members are adapted to straddle the rim and tire of the vehicle-wheel, which fit within the crotches thereof, so that the cross members serve as supports for the supporting-bars 1 to uphold the bars in a position above the vertical center of the vehicle-wheel or the full horizontal diameter of the wheel, as illustrated in Fig. I.

6 designates posts secured to the supporting-bars 1 near their forward ends at the rear of the forward cross member 4.

7 is a hand-lever, the free end of which extends rearwardly, while the forward end is formed into a yoke 8, that is pivoted at 9 and 10 to the posts 6.

11 is a cross-rod situated within the yoke 8 and having its ends seated in the arms of said yoke.

12 designates links, one end of each of which is loosely mounted on the cross-rod 11 and which extend rearwardly from said rod, as seen most clearly in Figs. I and III.

13 designates clamping-jaws occupying positions at the sides of the channel-rim B, so as to slidably engage said rim. These clamping-jaws are connected to the links 12 by pivot-pins 14, so as to be carried by said links. One of the clamping-jaws is provided with a smooth bore 15 (see Fig. IV) and the other jaw is provided with a screw-threaded bore.

16 is a clamp-screw having a screw-threaded body 17. This clamp-screw is first passed through the smooth bore 15 in one of the clamping-jaws 13, and its screw-threaded body is then passed through the screw-threaded bore in the second jaw, so that upon rotation of the screw the jaws may be drawn together to cause them to clamp the channel-rim B of the vehicle-wheel. Each of the clamping-jaws 13 is provided with an arm 18, projecting rearwardly therefrom. The arms 18 are grooved transversely, and seated in their grooves are lifting-plates 19, which are provided with longitudinal slots 20, that receive set-bolts 21. These set-bolts hold the retaining-plates adjustably to the arms of the clamping-jaws, so that they may be shifted longitudinally and properly positioned with respect to the channel-rim of the vehicle-wheel over which they project. In the top surface of the lifting-plates 19 and near their ends are transverse grooves 22.

In the practical use of my apparatus it is mounted upon the vehicle-wheel and supported thereon in the manner hereinbefore stated, the retaining-wires E, of ring form, having been previously placed in the channel-rim B. The clamping-jaws 13 are then tightened to the channel-rim B by means of the clamp-screw 16 sufficiently to hold the clamping-jaws against the channel-rim with enough resistance to prevent movement of the jaws when the lever 7 is raised to move the yoke 8 downwardly. The resistance of the clamping-jaws against the channel-rim is not, however, sufficient to prevent movement of the clamping-jaws when the hand-lever 7 is lowered and the yoke 8 is elevated or moved rearwardly, and said yoke is thereby permitted to carry therewith the jaws and the lifting-plates 19 appurtenant thereto.

The process of positioning the tire in the channel-rim B and seating the retaining-wires in grooves of said tire is then carried out in the following manner: In beginning the operation of applying the tire the retaining-wires are raised at the location of the lifting-plates 19 and seated in the transverse grooves 22 at the inner ends of said plates, the point at which the wires E are first raised being at one of the ends of the tire and the point at which the operation is completed being at the other end of the tire, as seen in Fig. I. The lifting-plates are then adjusted outwardly on the arms 18 of the clamping-jaws 13 to a sufficient degree to hold the uplifted retaining-wires far enough apart to allow the rubber tire to enter between them, but not to a degree that will cause binding of the wires against any of the adjacent parts of the apparatus. One end of the tire is now started into the channel-rim B between the lifting-plates 19, and the hand-lever 7 is next depressed and oscillates on its pivots to raise the retaining-wires E. The yoke 8 is at this time moved rearwardly in the arc of a circle, thereby causing sliding movement of the clamping-jaws 13 on the channel-rim B. At the same time that the hand-lever is depressed to occasion the movement of the clamping-jaws in the manner stated the tire C is pressed inwardly into the channel-rim by the operator's thumb, as illustrated in Fig. I, and the clamping-jaws during their movement cause the lifting-plates 19 to ride beneath the retaining-wires to keep them in elevated position adjacent to the lifting-plates, so that the wires may enter the grooves D in the tire as the tire is pressed into the channel-rim. The lever 7 is then again raised and the vehicle-wheel partially rotated within the apparatus, during which the clamping-jaws 13 adhere to the channel-rim and move therewith. The next downward movement of the lever presses the lifting-plates 19 again rearwardly to continue lifting action upon the retaining-wires at an advanced point, so that the tire may be pressed into the channel-rim and receive the wires in the same manner as that before stated. During the operation of the hand-lever 7 the apparatus is continuously moved around the wheel which it incloses, so that the lifting-plates 19 will entirely traverse the channel-rim B. This movement of the apparatus is obtained by reason of the V-shaped cross members 2 and 4 being loosely fitted to the rim of the wheel and the jaws 13 having clamping engagement with said rim. Owing to such arrangement when the hand-lever is raised the clamping-jaws adhere to the wheel channel-rim, and therefore serve as fulcrum members, and the hand-lever pivoting on a different point connected to the supporting-bars 1 causes the forward ends of said bars to be lifted and the forward cross-bar 4 to be carried therewith. At the same time the rear cross-bar 2 descends to a degree equal to the lift of the forward cross-bar, thereby altering the plane of the supporting-bars. The hand-lever is then moved downwardly, forcing both of the cross-bars 2 and 4 into close impact with the wheel channel-rim by moving them downwardly, and then the continued downward movement of the hand-lever causes the yoke 8 to move the clamping-jaws 13 rearwardly and carry the wire-lifting plates in a corresponding direction beneath the retaining-wires to elevate them for the introduction and retention of the tire C. The actions described are repeated until the entire tire has been applied and the wires seated in its grooves throughout its extent, after which the ends of the tire are cemented together in the usual manner and the vehicle-wheel is in condition for use. After the tire has been completely introduced the lifting-plates 19 are disconnected from the clamping-jaws 13 on removal of the nuts of the bolts 21, that hold them, and the wires are thereby released from said plates to move into the channel-rim at the point where they are last withheld therefrom and move freely into the remaining unoccupied portions of the grooves in the tire.

By the use of my apparatus constructed in accordance with my invention the tires may be readily and quickly applied to vehicle-wheels without straining effect upon the wires and the process of applying may be carried out either with the wheel removed from the vehicle or connected thereto, as the construction of the apparatus renders this possible.

I claim as my invention—

1. In an apparatus for applying tires to vehicle-wheels, the combination of supporting means fitted to the wheel, a hand-lever pivoted to said supporting means, clamping-jaws connected to said hand-lever and engaging the rim of said wheel, and means carried by said clamping-jaws for receiving and lifting the tire-retaining wires, substantially as set forth.

2. In an apparatus for applying tires to vehicle-wheels, the combination of supporting means fitted to the wheel, a hand-lever pivoted to said supporting means, clamping-jaws connected to said hand-lever and embracing the rim of the wheel, and retainingwire-lifting plates carried by said clamping-jaws, substantially as set forth.

3. In an apparatus for applying tires to vehicle-wheels, the combination of supporting means fitted to the wheel, a hand-lever pivoted to said supporting means, clamping-jaws connected to said hand-lever and embracing the rim of the wheel, and adjustable retaining-wire-lifting plates carried by said clamping-jaws, substantially as set forth.

4. In an apparatus for applying tires to vehicle-wheels, the combination of a support fitted to the wheel, a hand-lever pivoted to said support, a yoke carried by said hand lever, clamping-jaws pivotally connected to said yoke and embracing the rim of the wheel, and lifting-plates carried by said clamping-jaws for receiving the tire-retaining wires, substantially as set forth.

5. In an apparatus for applying tires to vehicle-wheels, the combination of supporting means fitted to the wheel, a hand-lever pivoted to said supporting means, a yoke carried by said lever, links pivoted to said yoke, clamping-jaws pivoted to said links to embrace the wheel-rim, a clamping-screw connecting said jaws, and lifting-plates carried by said jaws to receive the tire-retaining wires, substantially as set forth.

6. In an apparatus for applying tires to vehicle-wheels, the combination of supporting means, a hand-lever pivoted to said supporting means, clamping-jaws connected to said hand-lever and embracing the rim of the wheel, and grooved lifting-plates carried by said clamping-jaws to receive the tire-retaining wires, substantially as set forth.

7. In an apparatus for applying tires to vehicle-wheels, the combination of a pair of parallel supporting-bars, V-shaped cross members fitted to said bars to engage the wheel at its periphery, a hand-lever pivotally supported by said bars, and means carried by said hand-lever for engaging and lifting the tire-retaining wires, substantially as set forth.

8. In an apparatus for applying tires to vehicle-wheels, the combination of a pair of parallel supporting-bars, V-shaped cross members adjustably fitted to said bars to engage the wheel at its periphery, a hand-lever pivotally supported by said bars, and means carried by said hand-lever for engaging and lifting the tire-retaining wires, substantially as set forth.

EARL R. LANPHER.

In presence of—
N. J. JOHNSON,
W. H. SHEPHERD.